(No Model.)
H. BRANDES.
Vegetable Peeler and Slicer.
No. 242,185. Patented May 31, 1881.
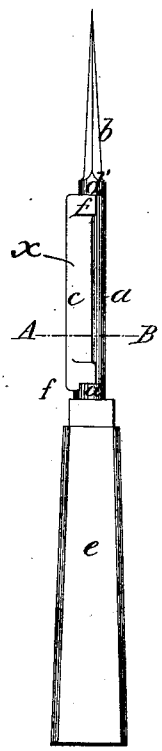
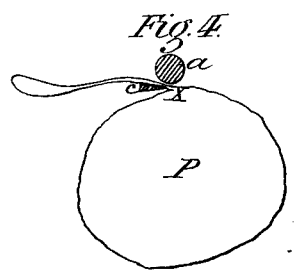
Witnesses
C. Wetter
Jo Hume
Inventor
Hermann Brandes

UNITED STATES PATENT OFFICE.

HERMANN BRANDES, OF HAMBURG, GERMANY.

VEGETABLE PEELER AND SLICER.

SPECIFICATION forming part of Letters Patent No. 242,185, dated May 31, 1881.

Application filed October 28, 1880. (No model.) Patented in Germany December 8, 1878.

*To all whom it may concern:*

Be it known that I, HERMANN BRANDES, of Hamburg, in the German Empire, have invented a new and useful Peeler and Slicer for Potatoes, Cucumbers, Apples, and other Fruits, (for which I have obtained a patent in Germany, bearing date December 8, A. D. 1878, No. 6,063,) of which the following is a specification.

My invention relates to an instrument for preparing potatoes, apples, cucumbers, or other fruit for food; and it consists in a knife pivoted at both ends to a shaft in such a manner that the cutting-edge of the pivoted knife coincides with the axis of the pivots and is always parallel with the said shaft. One end of the shaft is preferably formed into a knife-blade lancet-shaped, or of any other suitable shape, while the other end of the shaft is provided with a handle.

In the accompanying drawings, which serve to illustrate the invention, Figure 1 is a front elevation, Fig. 2 a side elevation, and Fig. 3 a cross-section, of the knife and peeler through line A B, while Fig. 4 shows its application for peeling potatoes.

$a$ is the shaft, which may be round, flat, prismatic, or of any other suitable section, and which ends in a lance-shaped single or double edged knife, $b$. On the side of the shaft are two bearings, $d\ d'$, bored out to receive the pivots $f$ and $f'$ of the peeling-knife $c$, the cutting-edge $x$ of which is always turned against the shaft $a$. The peeling-knife is triangular in cross-section, with equal sides, and so placed with regard to the pivots $f$ and $f'$ that the axis of the latter forms one line with the cutting-edge, whereby the distance between the shaft $a$ and the cutting-edge remains constant when the peeling-knife turns on its axis. The pivoting is limited (to about forty-five degrees) by a projection of the knife coming in contact with the lower bearing, $d'$, Figs. 1 and 3.

$e$ is the handle of the instrument.

The instrument is used by seizing the handle with the right hand, holding the fruit with the left hand against the shaft $a$ about the middle of the height of the blade $c$, and carrying the latter round the fruit with sufficient pressure to cause the blade to cut, or turning the fruit in the opposite direction. (See Fig. 4.)

The advantages of my method of peeling are increased facility and speed of operation and economy, the latter resulting from the uniform thickness of the peels, which depends entirely upon the distance of the cutting-edge from the shaft $a$.

When in operation the knife adjusts itself to every irregularity of the surface by turning in its bearings, while in the ordinary method of peeling the position or inclination of the knife must be continually adjusted by hand.

The instrument may be made of steel and wood combined, or of any other suitable material.

What I claim is—

1. The combination of a shaft with a movable knife placed with its cutting-edge toward the shaft and parallel with the latter and capable of turning on an axis which forms one straight line with the cutting-edge of the knife, substantially as and for the purpose described.

2. The combination of a shaft, $a$, provided with a handle, with a movable knife, $c$, placed with its cutting-edge toward the shaft and parallel with the latter, a pair of pivots, $f\ f'$, placed in one line with the cutting-edge of the knife, a pair of bearings attached to the shaft and bored out to receive the pivots, and a stop for limiting the angular motion of the knife, substantially as and for the purpose described.

In testimony whereof I have signed this specification in the presence of two subscribing witnesses.

HERMANN BRANDES.

Witnesses:
FRIED. BALLIN,
F. HINRICHS.